US010996478B2

(12) United States Patent
Yu et al.

(10) Patent No.: US 10,996,478 B2
(45) Date of Patent: May 4, 2021

(54) METHOD FOR CORRECTING IMAGE DISTORTION IN A HUD SYSTEM

(71) Applicants: HYUNDAI MOTOR COMPANY, Seoul (KR); KIA MOTORS CORPORATION, Seoul (KR)

(72) Inventors: Hee-An Yu, Bucheon-si (KR); Chi-Hyeon Kim, Suncheon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/597,590

(22) Filed: Oct. 9, 2019

(65) Prior Publication Data
US 2020/0117010 A1  Apr. 16, 2020

(30) Foreign Application Priority Data
Oct. 16, 2018  (KR) .................... 10-2018-0123320

(51) Int. Cl.
*G02B 27/01*  (2006.01)
*G06F 17/18*  (2006.01)
*G06T 5/00*  (2006.01)

(52) U.S. Cl.
CPC ......... *G02B 27/0172* (2013.01); *G06F 17/18* (2013.01); *G06T 5/006* (2013.01); *G02B 2027/011* (2013.01)

(58) Field of Classification Search
CPC ................................. G02B 27/0172
See application file for complete search history.

(56) References Cited

U.S. PATENT DOCUMENTS

| | | | | |
|---|---|---|---|---|
| 5,726,670 A | * | 3/1998 | Tabata | G02B 27/017 345/7 |
| 5,862,417 A | * | 1/1999 | Ogasawara | G02B 7/28 396/95 |
| 9,573,524 B2 | | 2/2017 | Kim | |
| 2010/0073773 A1 | * | 3/2010 | Hotta | G02B 27/01 359/630 |
| 2010/0157430 A1 | * | 6/2010 | Hotta | G02B 27/01 359/630 |
| 2011/0188760 A1 | * | 8/2011 | Wright | G06T 17/05 382/203 |
| 2015/0168719 A1 | | 6/2015 | Kim | |
| 2016/0377873 A1 | | 12/2016 | Kimura | |

(Continued)

FOREIGN PATENT DOCUMENTS

| | | |
|---|---|---|
| JP | 2013218346 A | 10/2013 |
| JP | 2017047794 A | 3/2017 |

(Continued)

*Primary Examiner* — William Boddie
*Assistant Examiner* — Andrew B Schnirel
(74) *Attorney, Agent, or Firm* — Lempia Summerfield Katz LLC

(57) ABSTRACT

A method for correcting image distortion in a Head-up Display (HUD) system may include: selecting an image correction target item in a HUD system displayed on a vehicle; receiving, when there is a change in the step in which its parameter values are set to be different from each other for the correction target item, the parameter values of the changed step; and outputting a HUD image by correcting it using image source values corresponding to the changed parameter values.

7 Claims, 22 Drawing Sheets

(56) References Cited

U.S. PATENT DOCUMENTS

2017/0269362 A1\* 9/2017 Yamasaki .......... G02B 27/0149
2019/0244587 A1\* 8/2019 Hada ....................... G06F 3/147

FOREIGN PATENT DOCUMENTS

| KR | 20140079905 A | 6/2014 |
|---|---|---|
| KR | 101424257 B1 | 7/2014 |
| KR | 101526424 B1 | 6/2015 |
| KR | 20150073676 A | 7/2015 |
| KR | 20170066749 A | 6/2017 |

\* cited by examiner

METHOD FOR CORRECTING IMAGE DISTORTION IN A HUD SYSTEM

CROSS-REFERENCE(S) TO RELATED APPLICATIONS

This application claims priority to Korean Patent Application No. 10-2018-0123320, filed on Oct. 16, 2018, which is incorporated herein by reference in its entirety.

BACKGROUND

Field of the Disclosure

Embodiments of the present disclosure relate to a Heads-up Display (HUD) system; and, more particularly, to a method for correcting image distortion in a HUD system.

Description of Related Art

A HUD system serves to project information such as vehicle driving conditions or the like onto a windshield glass viewed by a driver's eyes to check the information without distracting the driver's eyes. The HUD system projects the vehicle information provided from a thin film transistor (TFT) liquid crystal display (LCD) onto the windshield glass through primary reflection from a plane mirror and secondary reflection from a curved mirror with image position adjustment and correction functions to recognize the vehicle information through an image ahead of a driver.

However, when a HUD image is projected onto a windshield glass through a plane mirror, a curved mirror, or a dust cover, the distortion of the image may be caused by the characteristics, quality tolerance, and assembly tolerance of each component. In these instances, a driver may be disturbed while driving due to interference with visibility or the like, which may lead to an increase in fatigue of the driver's eyes and a deterioration in merchantability of the vehicle.

In order to correct such a distorted image in the related art, a three-step correction method has been proposed.

In a first step, an image that is actually implemented by a vision camera is compared with source data for automatic correction by a difference therebetween. In other words, the image is corrected by comparing its distortion with the source data based on the outer contour of the graphic image, thereby enabling plane distortion to be corrected. However, it is impossible to improve spatial distortion or image distortion, brightness difference, breakage, clogging, refraction, and so on.

In a second step, the outer image is determined with the naked eye by a driver, sitting upright, for correction. In other words, the distortion of the image determined by the driver's eyes is corrected by movement, rotation, or the like using a cluster User Setting Menu (USM). However, the distortion of the image is limitedly corrected by up/down movement, rotation, or the like.

In a third step, the image is determined using G-SCAN by the user's eyes for manual correction. In other words, the image is corrected by six functions such as Rotation, Shear, Aspect, Smile, Magnification, and Edge angle according to the driver's view using G-SCAN. This enables the shape of the image to be manually corrected in detail compared to that in the second step, but it is impossible for the user to directly correct it since separate equipment is required.

In addition, since the overall shape of the HUD image is merely corrected, it is impossible to correct the source distortion of the graphic.

Furthermore, other image distortions may occur when the image distortion is corrected. The outer image may be further distorted or additional distortion may occur even though the intermediate image is good.

The foregoing is intended merely to aid in the understanding of the background of the present disclosure, and is not intended to mean that the present disclosure falls within the purview of the related art that is already known to those having ordinary skill in the art.

SUMMARY

An embodiment of the present disclosure is directed to a method for correcting image distortion in a HUD system. The method is capable of fundamentally improving image distortion caused by quality or assembly tolerance of each component of a HUD system without using separate equipment.

Other objects and advantages of the present disclosure can be understood by the following description and can become apparent with reference to the embodiments of the present disclosure. Also, it should be apparent to those having ordinary skill in the art to which the present disclosure pertains that the objects and advantages of the present disclosure can be realized by the means as claimed and combinations thereof.

In accordance with an embodiment of the present disclosure, a method for correcting image distortion in a HUD system includes selecting an image correction target item in a HUD system displayed on a vehicle. The method also includes receiving, when there is a change in the step in which its parameter values are set to be different from each other for the correction target item, the parameter values of the changed step. The method further includes outputting a HUD image by correcting it using image source values corresponding to the changed parameter values.

The parameters may be $\alpha$, $\beta$, and $\gamma$ predefined in a distortion function $f(x)=\alpha x^2+\beta x+\gamma$ of the HUD system.

The distortion function of the HUD system may be modeled by reflecting distortion functions respectively modeled in consideration of qualities and tolerances of constituent components of the HUD system.

The distortion function of the HUD system may be optimized and modeled by a quadratic function through regression analysis.

The constituent components of the HUD system may include a plane mirror, a curved mirror, a dust cover, and a windshield glass. The distortion function of the HUD system may be modeled by reflecting distortion functions for the plane mirror, the curved mirror, the dust cover, and the windshield glass, respectively.

The correction target item may include: a double image correction for correcting a phenomenon in which an image is superimposed; a visual fatigue correction for correcting a phenomenon in which an image is unclear in focus; a rotation correction for correcting a tilted image; a horizontal movement correction for correcting a phenomenon in which an image is shifted in a horizontal direction; a vertical movement correction for correcting a phenomenon in which an image is shifted in a vertical direction; a horizontal correction for correcting bent distortion of an image in a horizontal direction; and a vertical correction for correcting bent distortion of an image in a vertical direction.

The double image correction may be performed such that the HUD image is corrected by changing the $\alpha$, $\beta$, and $\gamma$ values of the parameters.

The visual fatigue correction may be performed such that the HUD image is corrected by changing only the α value of the parameters.

The horizontal movement correction may be performed such that the HUD image is corrected by changing the α, β, and γ values of the parameters.

The horizontal correction may be performed such that the HUD image is corrected by changing only the α and γ values of the parameters.

The vertical correction may be performed such that the HUD image is corrected by changing the α, β, and γ values of the parameters.

DESCRIPTION OF SPECIFIC EMBODIMENTS

The accompanying drawings for illustrating embodiments of the present disclosure should be referred to in order to gain a sufficient understanding of the present disclosure, the merits thereof, and the objectives accomplished by the implementation of the present disclosure.

In the embodiments of the present disclosure, techniques well known in the art or repeated descriptions may be reduced or omitted to avoid obscuring appreciation of the disclosure by a person of ordinary skill in the art.

A method for correcting image distortion in a HUD system according to the present disclosure is characterized by optimizing an image distortion factor function of each constituent component of a HUD system and changing parameter values α, β, and γ of the function to correct an image in various manners.

In other words, the method analyzes the influence factors of the image and corrects a practical graphic image source value by tuning the reference value of the rate of change for component and system distortion. The method thus secures the quality of the image through complex distortion correction and maximizing merchantability.

First, it is necessary to define a distortion influence factor of each component of a HUD system and a distortion function thereby.

Figure 1:
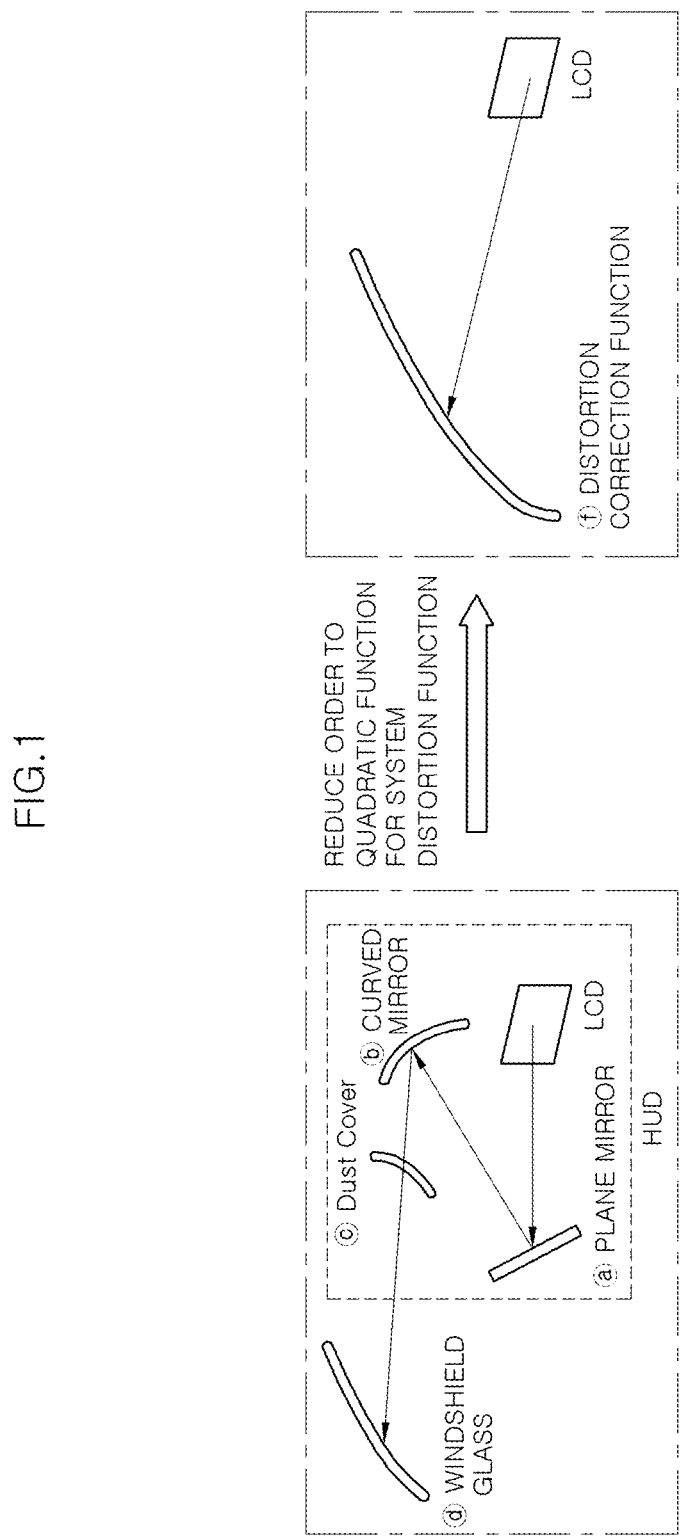
FIG. 1 conceptually illustrates a method for correcting image distortion in a HUD system according to the present disclosure.

FIG. 1 conceptually illustrates the method for correcting image distortion in a HUD system according to the present disclosure. Influence factors corresponding to respective components and distortion functions therefor are summarized in Table 1.

TABLE 1

| Influence Factor | Distortion Content | Distortion Function |
|---|---|---|
| a | image position reflection, image refraction | $f_1(x) = ax + b$ |

TABLE 1-continued

| Influence Factor | Distortion Content | Distortion Function |
|---|---|---|
| b | image size, image refraction, imaging distance | $f_2(x) = cx^2 + dx + e$ |
| c | double image, brightness | $f_3(x) = fx^2 + gx + h$ |
| d | image magnification, double image blur/deformation | $f_4(x) = ix^3 + jx^2 + kx + 1$ |
| e | system image | $f_5(x) = s_{12}x^{12} + s_{11}x^{11} + s_{10}x^{10} + \ldots + s_1x + s_0$ |

The influence factor 'a' is a plane mirror that reflects an image position and causes image refraction. A distortion function modeled as a linear function is derived in consideration of the quality and assembly tolerance of the plane mirror.

The influence factor 'b' is a curved surface mirror that magnifies an image and magnifies image refraction and an imaging distance. A distortion function modeled as a quadratic function is derived in consideration of the quality and assembly tolerance of the curved mirror.

The influence factor 'c' is a dust cover that changes a double image and image brightness. A distortion function modeled as a quadratic function is derived in consideration of image distortion through the dust cover.

The influence factor 'd' is a windshield glass that deforms image magnification, a double image, and an image. A distortion function modeled as a cubic function is derived in consideration of the quality and assembly tolerance of the windshield glass.

The influence factor 'e' is a total of image displays and distortion parameter values in the HUD system, and the distortion function therefor is a 12th function.

After the total distortion function of the system image is modeled, it is optimized by the quadratic function approximate to the 12th function through regression analysis as follows:

$$f_6(x) = \alpha x^2 + \beta x + \gamma.$$

The present disclosure corrects image distortion by changing the parameter values α, β, and γ of the optimized distortion function. More specifically, the present disclosure enables correction such as double image correction, visual fatigue correction, rotation correction, horizontal movement correction, vertical movement correction, horizontal correction, or vertical correction by adjusting α, β, and γ.

The system distortion function, which is the total distortion function of the 12th function, is derived by the following procedure.

When the image passes through a and then b, the distortion function is a quadratic function of $$f_2(f_1(x)) = c(f_1(x))^2 + d(f_1(x)) + e = a^2cx^2 \ldots$$

Next, when the image passes through a, b, and then c, the distortion function is a quartic function of $$f_3(f_2(f_1(x))) = f(f_2(f_1(x)))^2 + g(f_2(f_1(x))) + h = f(a^2cx^2 + \ldots)^2 + g(a^2cx^2 + \ldots) + h = a^4c^2fx^4 + \ldots.$$

When the image passes through a, b, c, and then d, it is modeled by a 12th function of $$f_4(f_3(f_2(f_1(x)))) = i(f_3(f_2(f_1(x))))^3 + j(f_3(f_2(f_1(x))))^2 + k(f_3(f_2(f_1(x)))) + 1 = i(a^4c^2fx^4 + \ldots)^3 + j(a^4c^2fx^4 + \ldots)^2 + k(a^4c^2fx^4 + \ldots) + 1 = a^{12}c^6f^3jx^{12} + \ldots.$$

Finally, the quadratic function approximate to the 12th function is derived through regression analysis by the optimization to $f_6$.

This enables the derivation of the quadratic function that uses three or more arbitrary points on the 12th function to minimize the error sum of squares at the corresponding points. The 12th function is optimized by the quadratic function because it is an even function.

Figure 2:
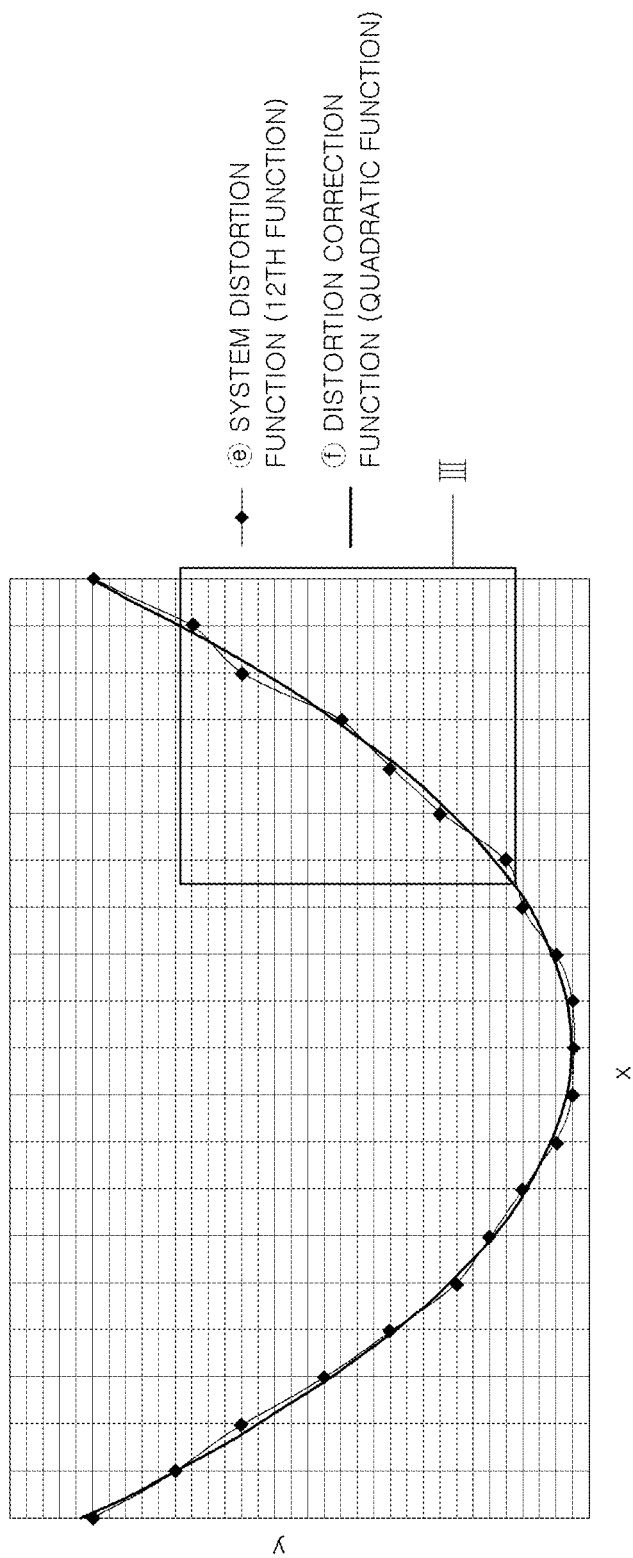
FIGS. 2 and 3 illustrate a 12th distortion function and a quadratic function approximating the same.
Figure 3:
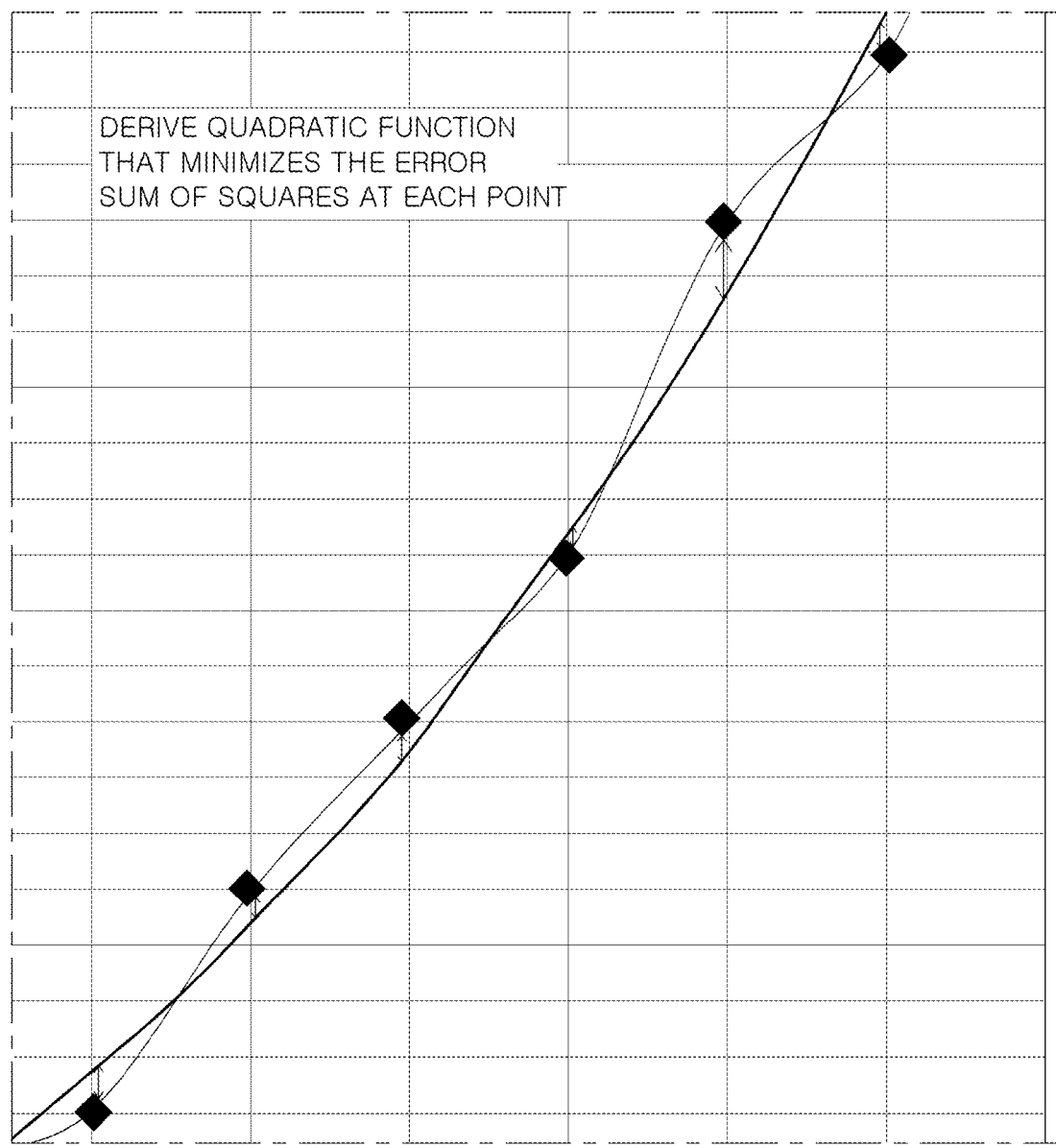

An example is described for obtaining $f_6=\alpha x^2+\beta x+\gamma$ using 21 points in the following Table 2 with reference to FIGS. 2 and 3.

TABLE 2

| x | | | | | | | | | | | | | | | | | | | | | |
|---|---|---|---|---|---|---|---|---|---|---|---|---|---|---|---|---|---|---|---|---|---|
| | −10 | −9 | −8 | −7 | −6 | −5 | −4 | −3 | −2 | −1 | 0 | 1 | 2 | 3 | 4 | 5 | 6 | 7 | 8 | 9 | 10 |
| y | 3.0 | 2.5 | 2.1 | 1.6 | 1.2 | 0.8 | 0.6 | 0.4 | 0.2 | 0.1 | 0.1 | 0.1 | 0.2 | 0.4 | 0.5 | 0.9 | 1.2 | 1.5 | 2.1 | 2.4 | 3.0 |

First, $\alpha$, $\beta$ and $\gamma$ are set to parameters, and the error function $e(\alpha, \beta, \gamma)$ by the error at each point is obtained as follows:

$e(\alpha,\beta,\gamma)=|f_6(-10)-3.0|^2+|f_6(-9)-2.5|^2+ \ldots +|f_6(9)-2.4|^2+|f_6(10)-3.0|^2$.

$f_6(x)$ is obtained using ($\alpha$, $\beta$, and $\gamma$) obtained by allowing the error function to be minimized as follows:

$(\alpha,\beta,\gamma)=\arg \min e(\alpha,\beta,\gamma)\alpha,\beta,\gamma$.

This optimization enables quick correction since computational complexity is reduced compared to the 12th function when the image is corrected in the future.

Figure 4:
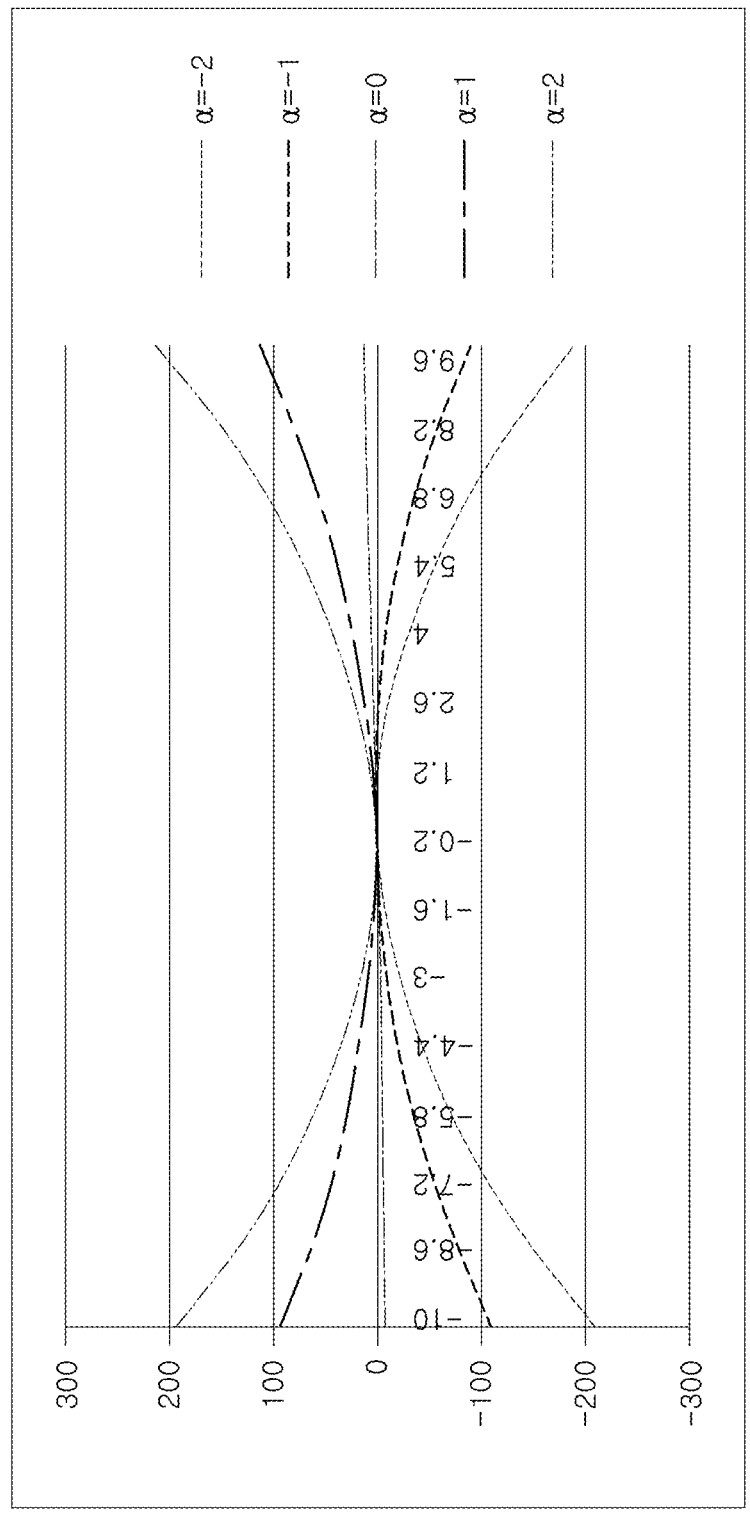
FIGS. 4-6 illustrate a change of each parameter value of a distortion function.
Figure 5:
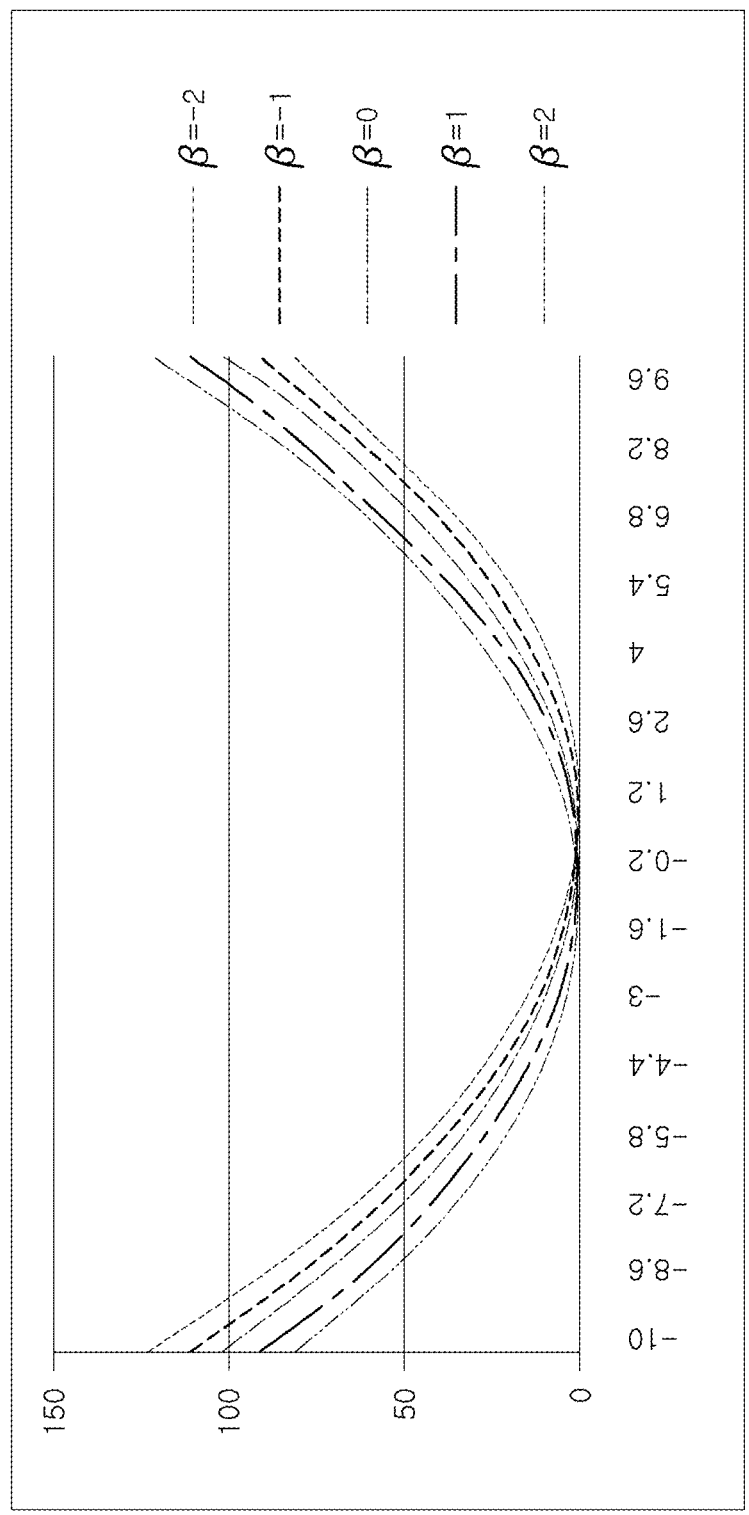
Figure 6:
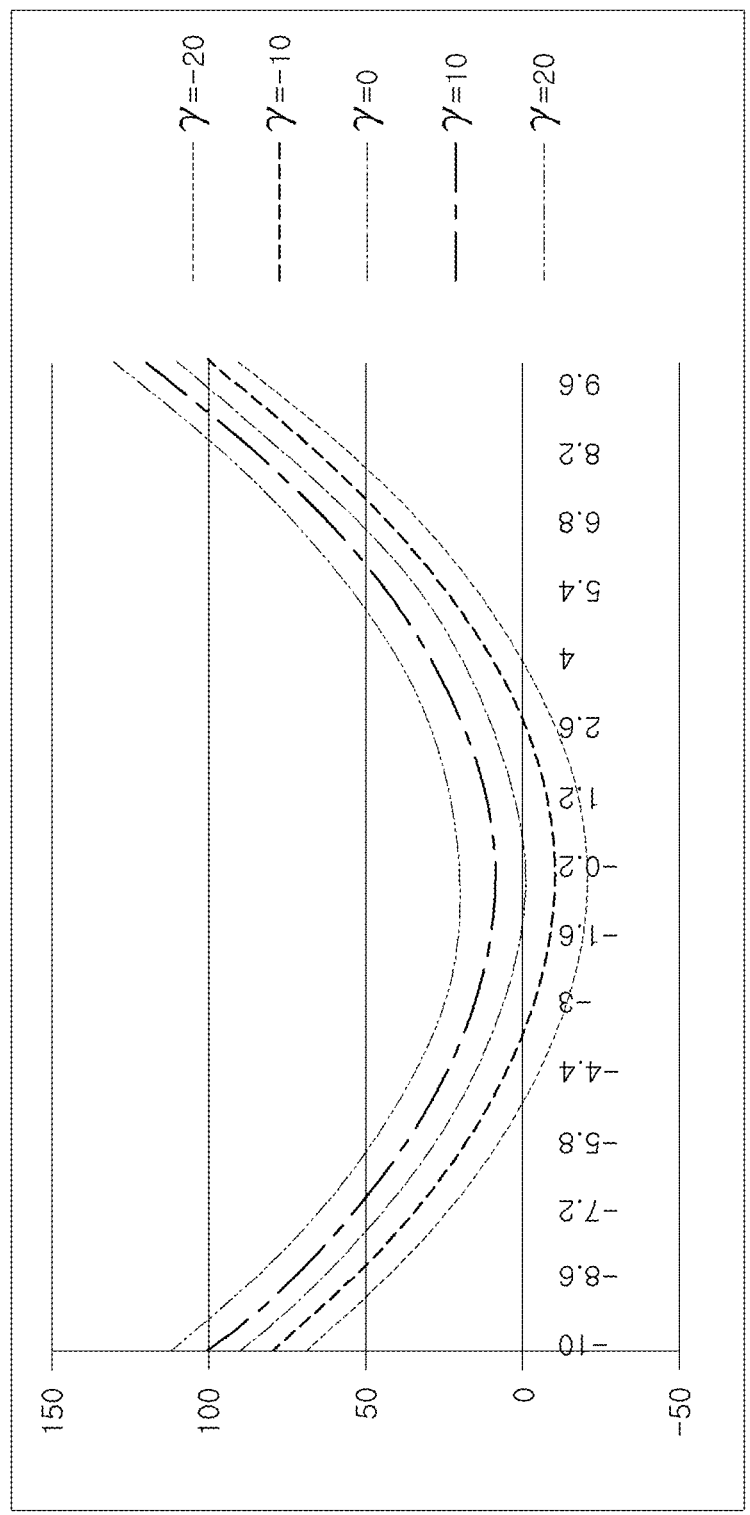

FIGS. 4-6 illustrate the results obtained by changing the parameter values of the above modeled distortion function. Thus, it is possible to know the meaning of the change of each parameter value.

FIG. 4 illustrates the change of the distortion function according to the change of the $\alpha$ value when $\beta=1$ and $\gamma=1$. It can be seen that the curvature is changed according to the change of the $\alpha$ value.

FIG. 5 illustrates the change of the distortion function according to the change of the $\beta$ value when $\alpha=1$ and $\gamma=1$. It can be seen that the curve moves horizontally according to the change of the $\beta$ value.

FIG. 6 illustrates the change of the distortion function according to the change of the $\gamma$ value when $\alpha=1$ and $\beta=1$. It can be seen that the curvature moves vertically according to the change of the $\gamma$ value.

Therefore, it is possible to additionally provide correction suitable for the driver in addition to the basic correction by enabling the driver to operate $\alpha$, $\beta$, and $\gamma$ values.

Figure 7:
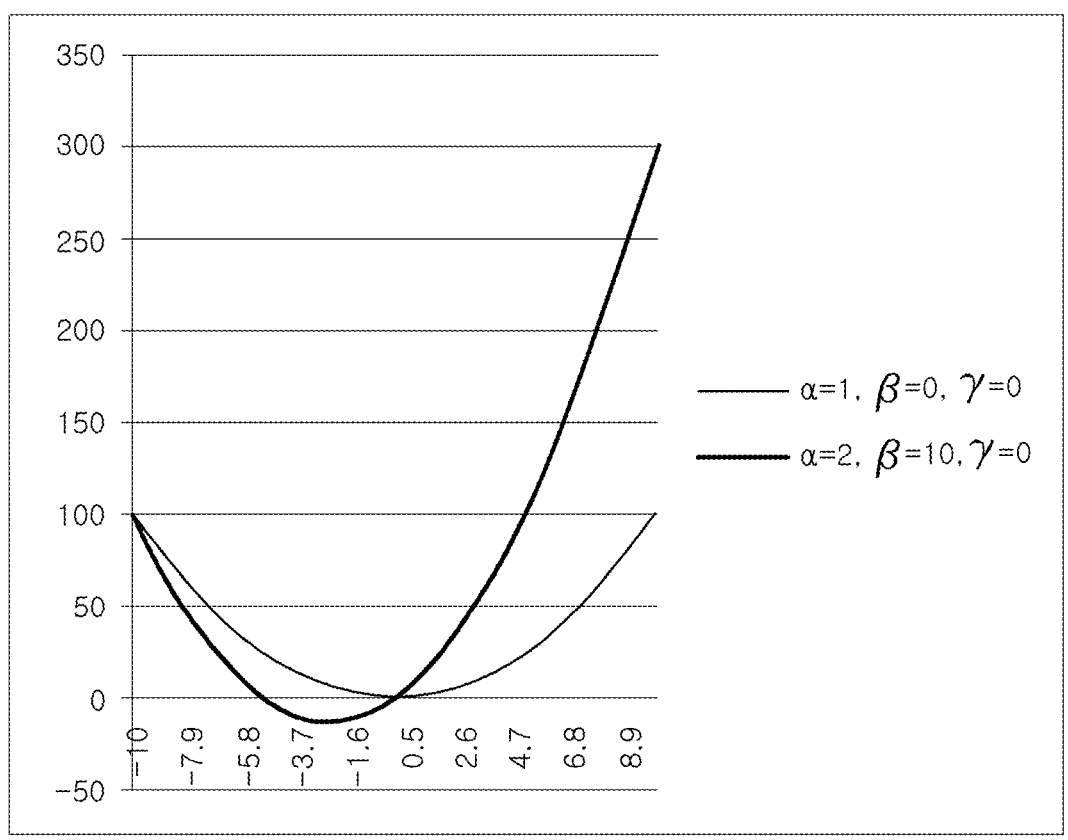
FIGS. 7 and 8 illustrate an example of change in a distortion function when three parameter values of the distortion function are changed.
Figure 8:
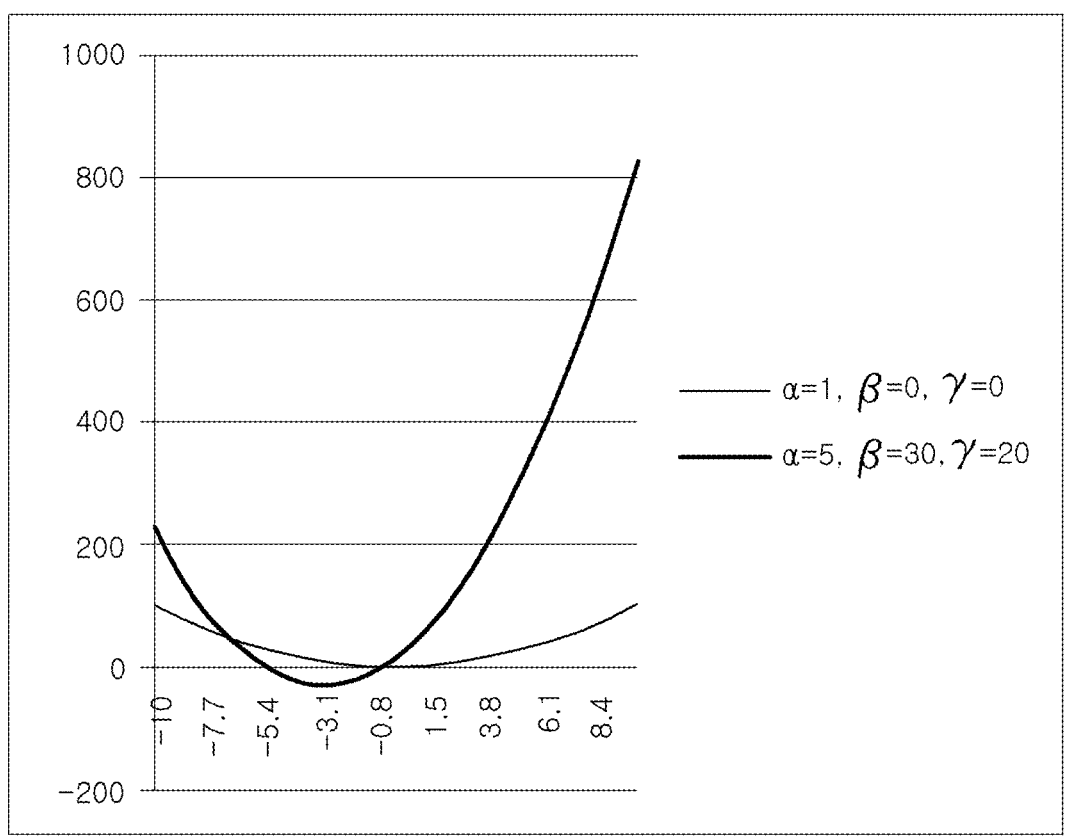

FIGS. 7 and 8 illustrate an example of change in the distortion function when three parameter values of the distortion function are changed. Thus, it is possible to know the correction according to the parameter value with more accuracy.

FIG. 7 illustrates a case where $\gamma=0$, $\alpha$ is changed from 1 to 2, and $\beta$ is changed from 0 to 10. FIG. 8 illustrates a case where $\alpha$ is changed from 1 to 5, $\beta$ is changed from 0 to 30, and $\gamma$ is changed from 0 to 20.

The distortion function may be expressed as follows:

$$f(x) = \alpha x^2 + \beta x + \gamma = \alpha\left(x + \frac{\beta}{2\alpha}\right)^2 + \gamma - \frac{\beta^2}{4\alpha}.$$

In other words, when the parameters are changed at the same time, it can be seen that the curvature is changed by $\alpha$, the horizontal movement is changed by $$-\frac{\beta}{2\alpha}, -\frac{\beta}{2\alpha},$$

and the vertical movement is changed by $$\gamma - \frac{\beta^2}{4\alpha^2}\gamma - \frac{\beta^2}{4\alpha^2}.$$

As described above, it can be seen that the method for correcting image distortion in a HUD system according to the present disclosure corrects the image in various manners by: modeling the distortion function for the distortion influence factor of each component of the HUD system; modeling the total distortion function as the quadratic function; and combining and adjusting three parameter values of the modeled quadratic distortion function.

The present disclosure provides a driver with a combination of $\alpha$, $\beta$, and $\gamma$ through internal calculation, so that the driver can numerically adjust the correction content through a switch or the like and display it on the cluster USM.

Hereinafter, an individual image distortion situation and a corresponding image distortion correction method are described with reference to FIGS. 9-15.

(1) Double Image Correction

The double image is a phenomenon in which the graphic is superimposed by internal reflection and refraction when light is transmitted through the dust cover and the windshield glass. It can be corrected by adjusting the refractive index in the lens.

Since the refractive index is related to the curvature adjustment of the lens, the double image can be corrected using $\alpha$.

In order to prevent the double image caused by the windshield glass, the correction in the horizontal direction is also performed through $\beta$.

Finally, to minimize the change of the focal position according to the change of curvature, the movement in the horizontal direction is considered using $\gamma$.

Figure 9:
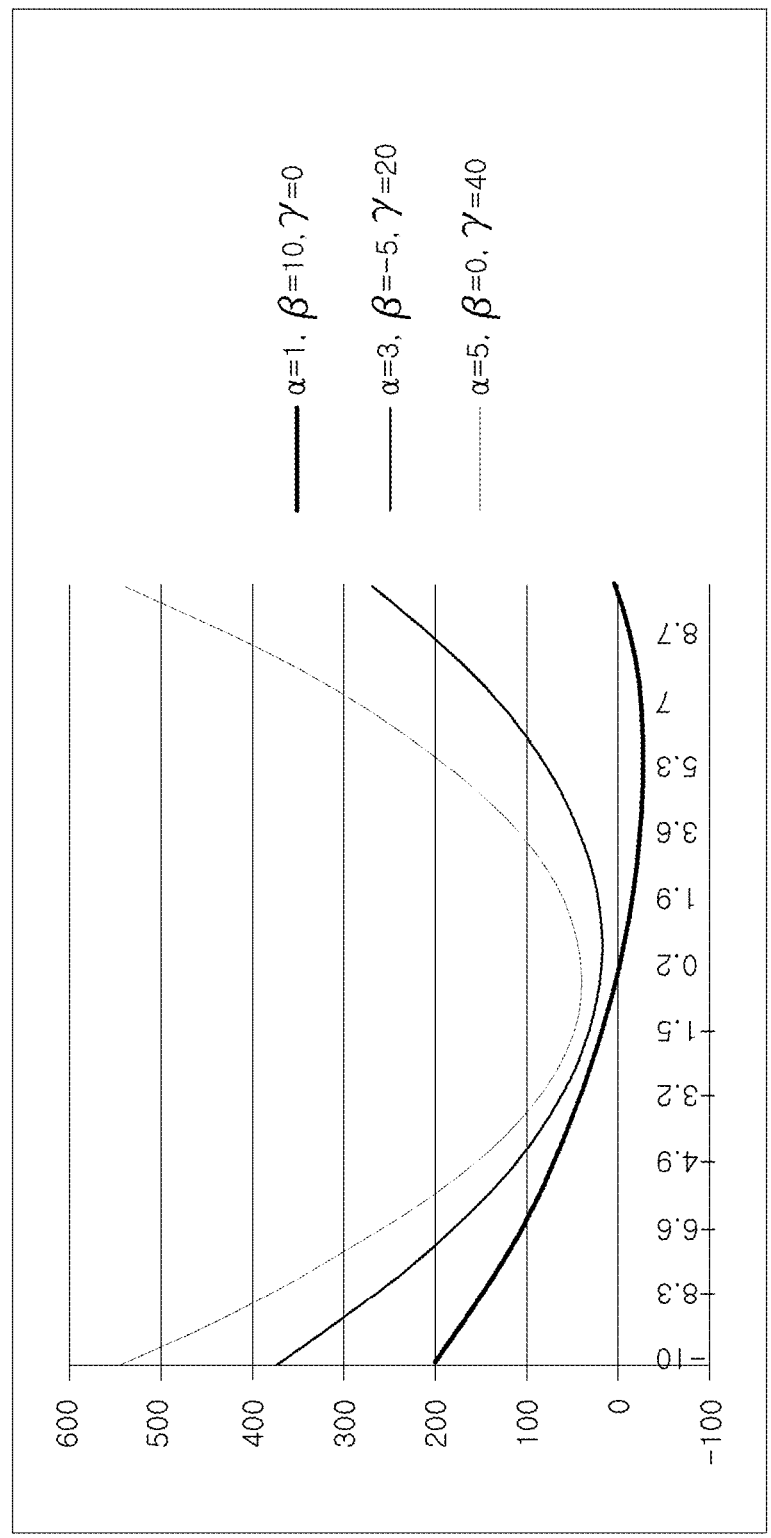
FIGS. 9-15 illustrate a specific correction example by adjustment of distortion function parameters.

The double image cannot be corrected in past methods or techniques, but it can be corrected by three steps of ($\alpha=1$, $\beta=-10$, and $\gamma=0$), ($\alpha=3$, $\beta=-5$, and $\gamma=20$), and ($\alpha=5$, $\beta=0$, and $\gamma=40$) as in FIG. 9.

(2) Visual Fatigue Correction

The visual fatigue is a phenomenon in which the focus of the HUD image is unclear in the driver's view so that the graphic is multi-focalized with unstable focus as if astigmatism. It can be resolved by adjusting the curvature of the mirror and the lens, i.e., the visual fatigue can be corrected by changing α.

Figure 10:
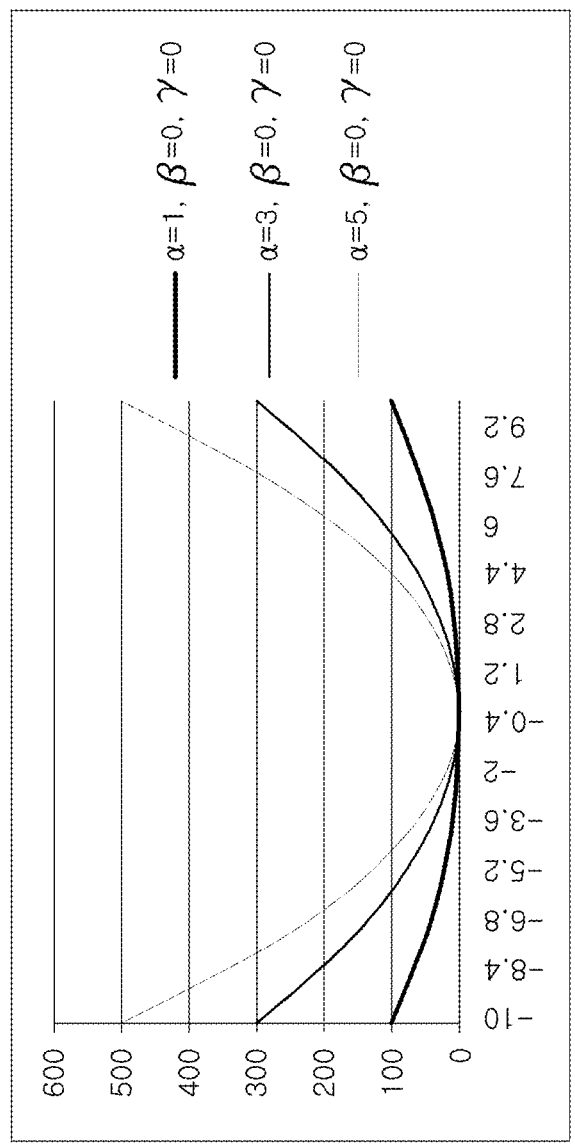

The visual fatigue cannot be corrected in past methods or techniques, but it can be corrected by three steps of (α=1, β=0, and γ=0), (α=3, β=0, and γ=0), and (α=5, β=0, and γ=0) as in FIG. 10.

(3) Rotation Correction

The rotation is a phenomenon in which the image is tilted to the left or right in the driver's view. It can be corrected by adjusting the α value to change the curvature and adjusting the β value to adjust the zero point on the horizontal distance.

Figure 11:
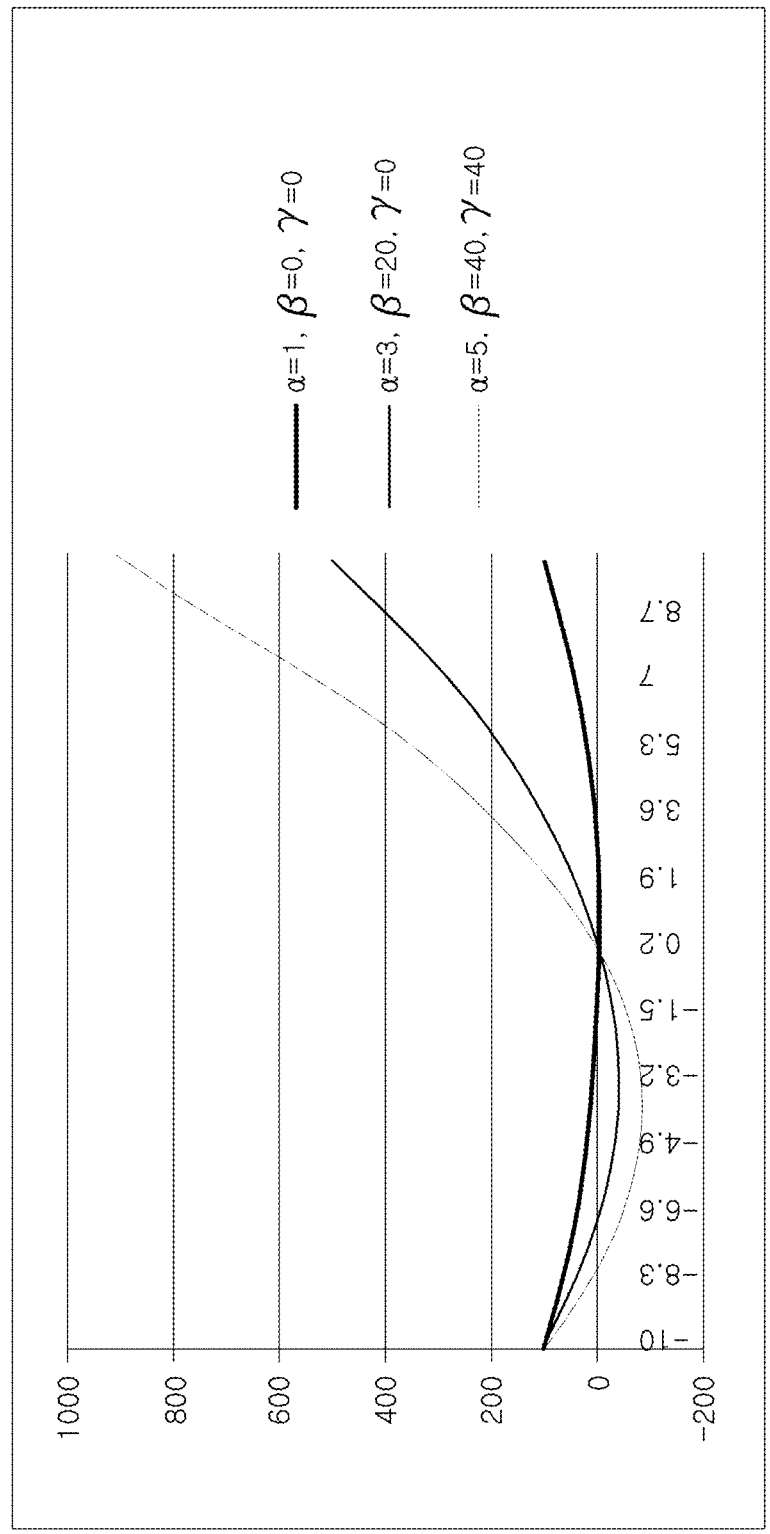

The rotation can be corrected by three steps of (α=1, β=0, and γ=0), (α=3, β=20, and γ=0), and (α=5, β=40, and γ=0) as in FIG. 11.

(4) Horizontal Movement Correction

The horizontal movement is a phenomenon in which the graphic is shifted to the left and right on the HUD display screen. It is corrected by horizontally moving the HUD image in the driver's view.

The horizontal movement is corrected by changing γ to prevent a change in the vertical direction in addition to changing the parameter β affecting the horizontal direction.

In other words, since the origin coordinates in $$f(x) = \alpha x^2 + \beta x + \gamma = \alpha\left(x + \frac{\beta}{2\alpha}\right)^2 + \gamma - \frac{\beta^2}{4\alpha^2} f(x) = \alpha x^2 + \beta x + \gamma =$$

$$\alpha\left(x + \frac{\beta}{2\alpha}\right)^2 + \gamma - \frac{\beta^2}{4\alpha^2} \text{ are } \left(-\frac{\beta}{2\alpha} - \frac{\beta}{2\alpha}, \gamma - \frac{\beta^2}{4\alpha^2} \gamma - \frac{\beta^2}{4\alpha^2}\right),$$

the horizontal movement is affected by α and β in the vertical direction.

Therefore, it is necessary to change the horizontal movement by $$\gamma - \frac{\beta^2}{4\alpha^2} \gamma = \frac{\beta^2}{4\alpha^2}$$

so that the vertical direction is not changed.

Figure 12:
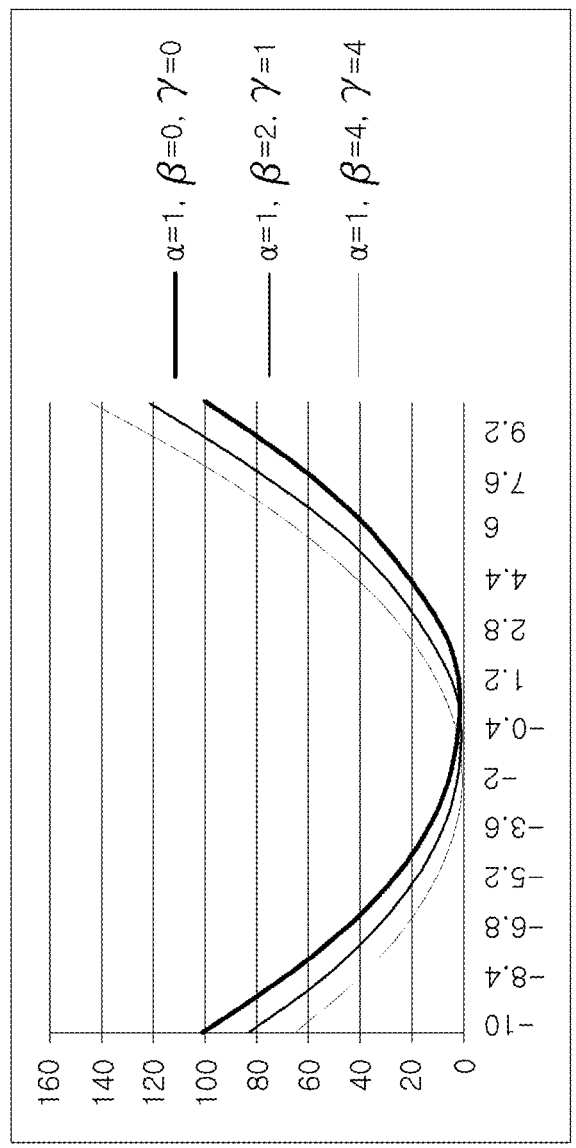

The horizontal movement cannot be corrected in past methods or techniques, but it can be corrected by three steps (α=1, β=0, and γ=0), (α=1, β=2, and γ=1), and (α=1, β=4, and γ=4) as in FIG. 12.

(5) Vertical Movement Correction

The vertical movement is a phenomenon in which the graphic is shifted up and down on the HUD display screen. It is corrected by vertically moving the HUD image in the driver's view.

The vertical movement is corrected by only the parameter γ affecting the vertical direction.

Figure 13:
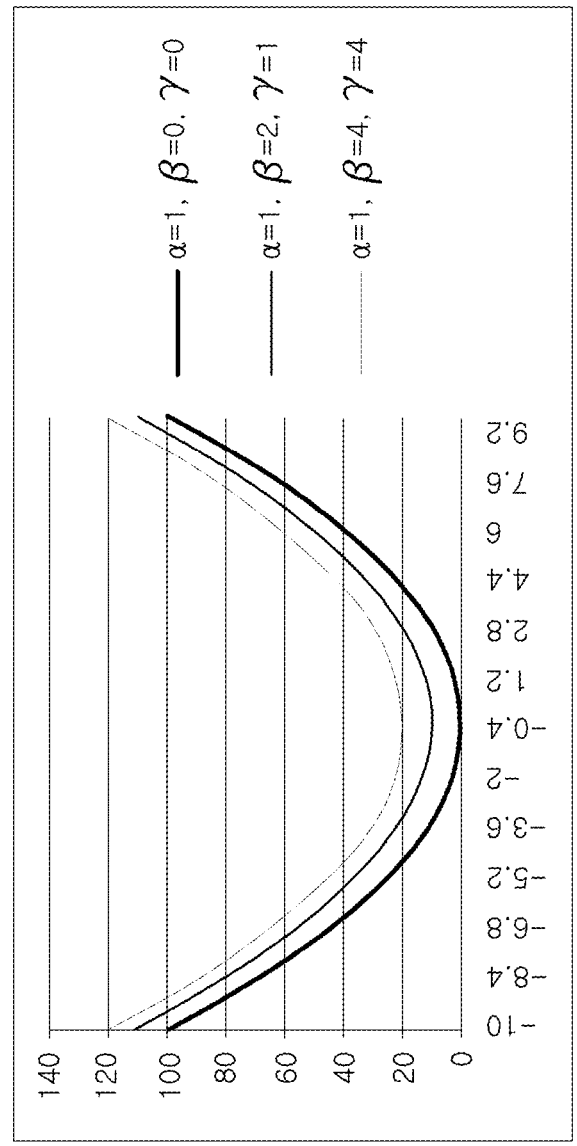

The vertical movement can be corrected by three steps of (α=1, β=0, and γ=0), (α=1, β=0, and γ=10), and (α=1, β=0, and γ=20) as in FIG. 13.

(6) Horizontal Correction

The horizontal shape is a phenomenon in which the horizontal graphic is broken and distorted on the HUD display screen. The horizontal correction is to adjust the bent distortion in the horizontal direction.

The α value must be adjusted since the horizontal shape is mainly affected by the curvature.

In this case, the γ value is adjusted and vertically moved to adjust the zero point in the vertical direction.

Figure 14:
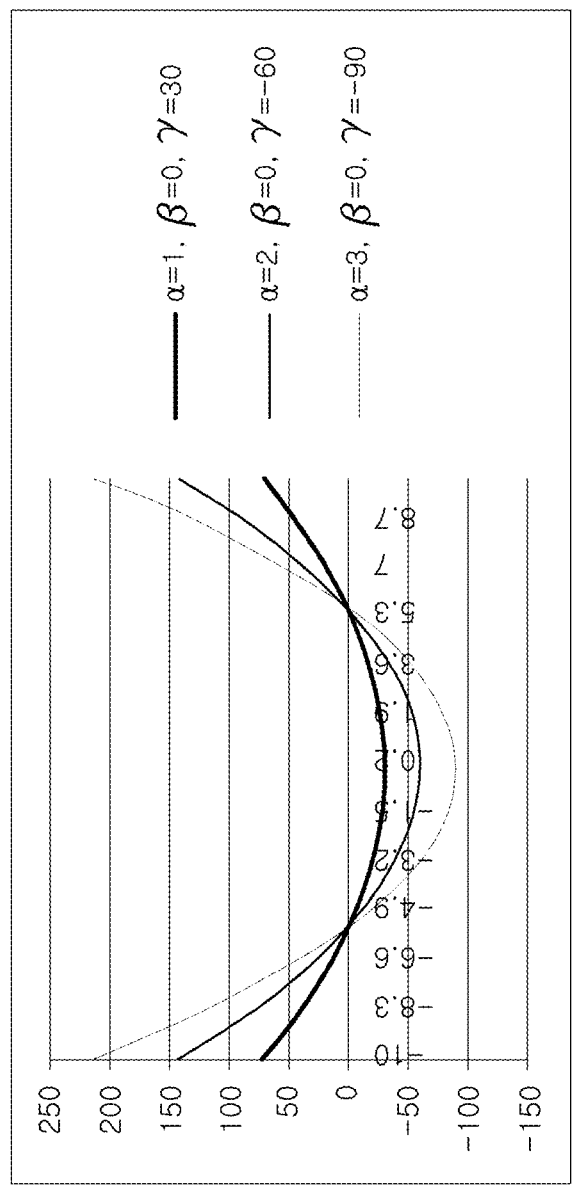

The horizontal shape cannot be corrected in past methods or techniques, but it can be corrected by three steps of (α=1, β=0, and γ=−30), (α=2, β=0, and γ=−60), and (α=3, β=0, and γ=−90) as in FIG. 14.

(7) Vertical Correction

The vertical shape is a phenomenon in which the vertical graphic is broken and distorted on the HUD display screen. The vertical correction is to adjust the bent distortion in the vertical direction.

The α value must be adjusted since the vertical shape is mainly affected by the curvature.

In this case, the β and γ values are adjusted to adjust the zero point.

Figure 15:
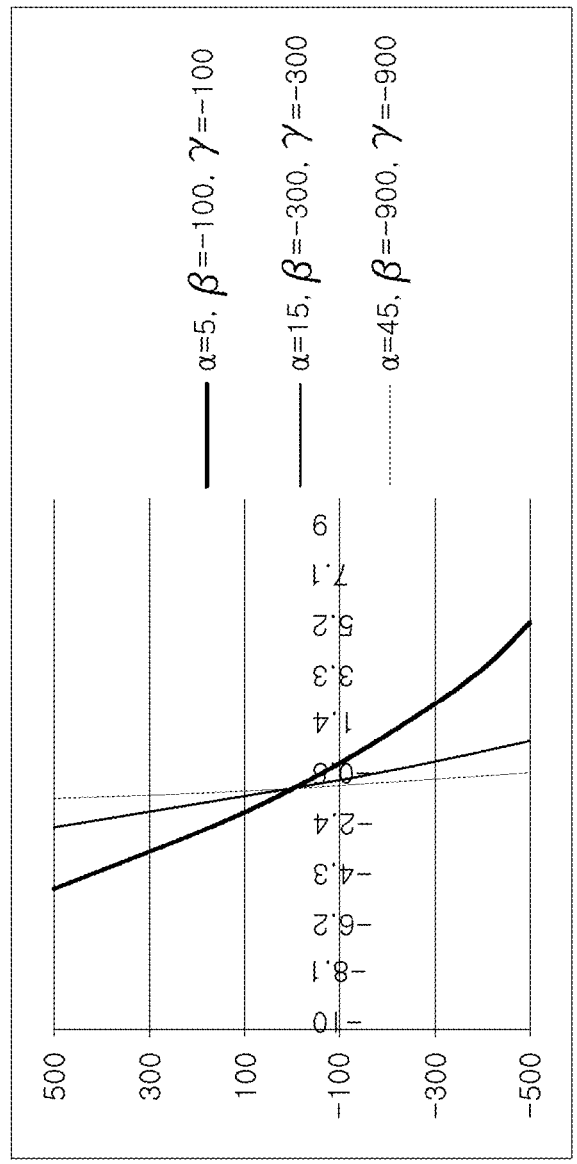
Figure 16:
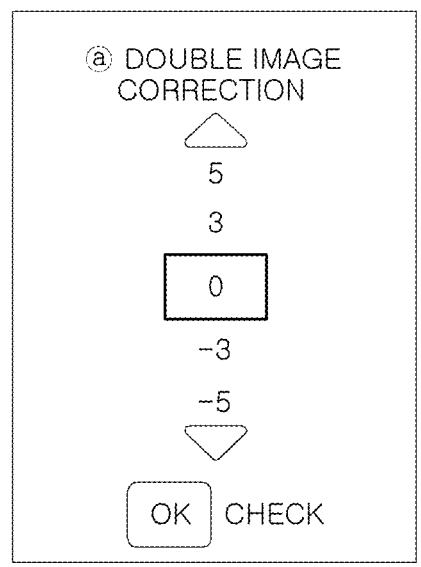
FIGS. 16-22 illustrate an interface for a driver's operation with respect to the specific correction example.

The vertical shape cannot be corrected in past methods or techniques, but it can be corrected by three steps of (α=5, β=−100, and γ=−100), (α=15, β=−300, and γ=−300), and (α=45, β=−900, and γ=−900) as in FIG. 15.

The present disclosure provides a driver with a combination of α, β, and γ through internal calculation, so that the driver can numerically adjust the correction content through a switch or the like and display it on the cluster USM.

By mounting an application program to which the distortion correction method of the present disclosure is applied on a data processing processor for processing image source data for vehicle information, and by outputting an image, the parameter value of which is changed by the application program, by the driver's control input, the image, the distortion of which is corrected, is projected onto the glass or the like.

FIGS. 16-22 illustrate an example on the cluster USM. In the case of the double image correction in FIG. 16, when the driver adjusts and changes the switch or the like from 0 to 3 and from 3 to 5, the double image can be corrected from (α=1, β=−10, and γ=0) to (α=3, β=−5, and γ=20) and from (α=3, β=−5, and γ=20) to (α=5, β=0, and γ=40) as illustrated above.

Figure 17:
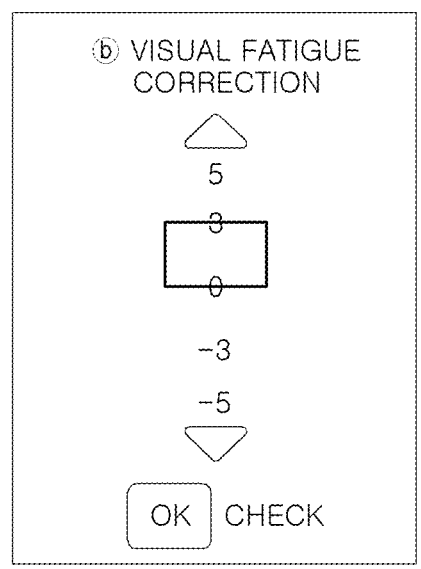

In the case of the visual fatigue correction in FIG. 17, when the driver adjusts and changes the switch or the like from 0 to 3 and from 3 to 5, the visual fatigue can be corrected from (α=1, β=0, and γ=0) to (α=3, β=0, and γ=0) and from (α=3, β=0, and γ=0) to (α=5, β=0, and γ=0) as illustrated above.

Figure 18:
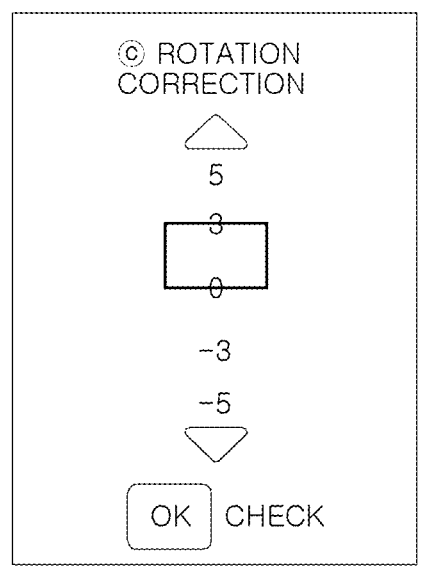

In the case of the rotation correction in FIG. 18, when the driver adjusts and changes the switch or the like from 0 to 3 and from 3 to 5, the rotation can be corrected from (α=1, β=0, and γ=0) to (α=3, β=20, and γ=0) and from (α=3, β=20, and γ=0) to (α=5, β=40, and γ=0) as illustrated above.

Figure 19:
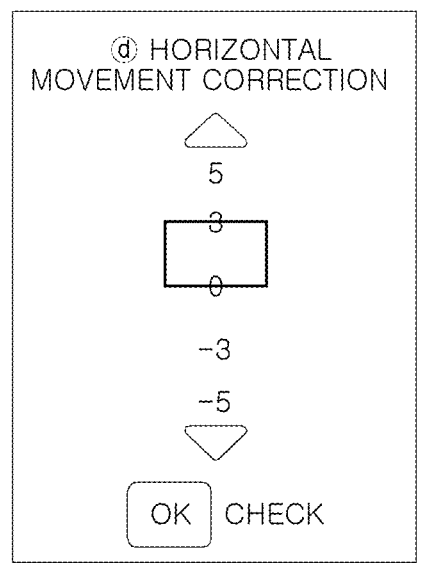

In the case of the horizontal movement correction in FIG. 19, when the driver adjusts and changes the switch or the like from 0 to 3 and from 3 to 5, the horizontal movement can be corrected from (α=1, β=0, and γ=0) to (α=1, β=2, and γ=1) and from (α=1, β=2, and γ=1) to (α=1, β=4, and γ=4) as illustrated above.

Figure 20:
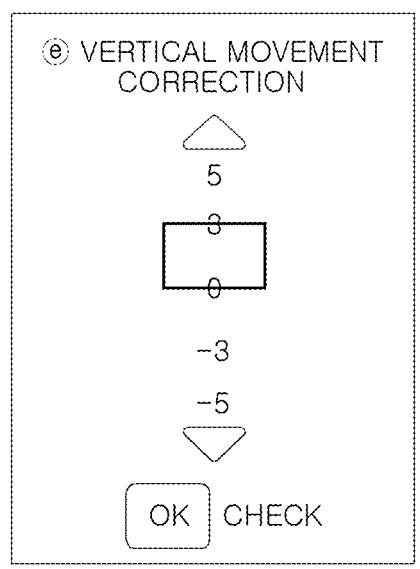

In the case of the vertical movement correction in FIG. 20, when the driver adjusts and changes the switch or the like from 0 to 3 and from 3 to 5, the vertical movement can be corrected from (α=1, β=0, and γ=0) to (α=1, β=0, and γ=10) and from (α=1, β=0, and γ=10) (α=1, β=0, and γ=20) as illustrated above.

Figure 21:
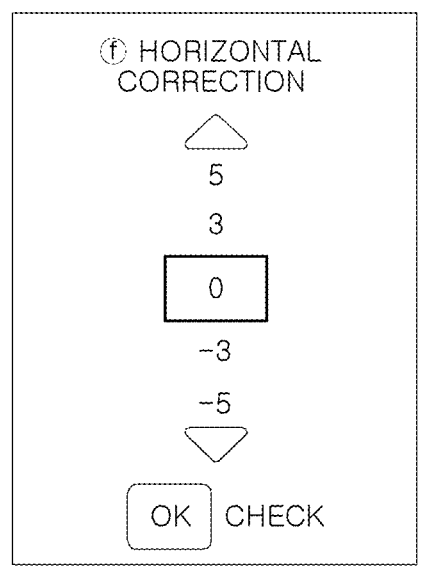

In the case of the horizontal correction in FIG. 21, when the driver adjusts and changes the switch or the like from 0 to 3 and from 3 to 5, the horizontal shape can be corrected from ($\alpha$=1, $\beta$=0, and $\gamma$=−30) to ($\alpha$=2, $\beta$=0, and $\gamma$=−60) and from ($\alpha$=2, $\beta$=0, and $\gamma$=−60) to ($\alpha$=3, $\beta$=0, and $\gamma$=−90) as illustrated above.

Figure 22:
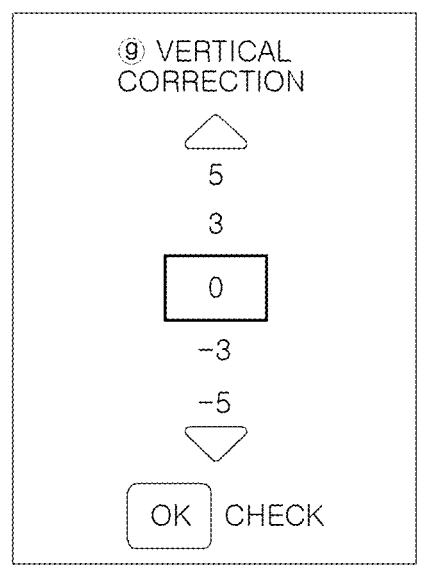

In the case of the vertical correction in FIG. 22, when the driver adjusts and changes the switch or the like from 0 to 3 and from 3 to 5, the vertical shape can be corrected from ($\alpha$=5, $\beta$=−100, and $\gamma$=−100) to ($\alpha$=15, $\beta$=−300, and $\gamma$=−300) and from ($\alpha$=15, $\beta$=−300, and $\gamma$=−300) to ($\alpha$=45, $\beta$=−900, and $\gamma$=−900) as illustrated above.

The method for correcting image distortion in a HUD system according to the present disclosure can perform more suitable correction and substantial correction by modeling the image distortion influence factors of the constituent components of the HUD system to calculate the distortion function, by optimizing the distortion function by the quadratic function approximate to the 12th function through regression analysis, and by correcting the image distortion by the parameters $\alpha$, $\beta$, and $\gamma$ values of the quadratic function and a combination thereof.

Specifically, it is possible to perform image correction such as double image correction, visual fatigue correction, rotation correction, horizontal movement correction, vertical movement correction, horizontal correction, or vertical correction.

Since this image distortion correction is performed based on the distortion factor value of each component other than the image center, it is possible to perform more suitable correction.

It is possible to correct the image distortion on the plane or the distortion in the space by changing the system image source value.

Therefore, it is possible to provide clear graphic quality and increase merchantability by the driver-customized correction.

While the specific embodiments have been described with reference to the drawings, the present disclosure is not limited thereto. It will be apparent to those having ordinary skill in the art that various changes and modifications may be made without departing from the spirit and scope of the disclosure as defined in the following claims. Therefore, these changes and modifications will fall within the scope of the disclosure as long as they are apparent to those having ordinary skill in the art. The scope of the present disclosure should be defined based on the entire content set forth in the appended claims.

What is claimed is:

1. A method for correcting image distortion in a Head-up Display (HUD) system, the method comprising:
   selecting an image correction target item in the HUD system displayed on a vehicle;
   receiving, when there is a change in a step in which its parameter values are set to be different from each other for the image correction target item by a user's control input, the parameter values of the changed step; and
   outputting a HUD image by correcting it using image source values corresponding to the parameter values of the changed step,
   wherein the parameter values are $\alpha$, $\beta$, and $\gamma$ predefined in a distortion function $f(x)=\alpha x^2+\beta x+\gamma$ of the HUD system,
   wherein the distortion function of the HUD system is modeled by reflecting distortion functions respectively modeled in consideration of qualities and tolerances of constituent components of the HUD system,
   wherein the distortion function of the HUD system is optimized and modeled by a quadratic function through regression analysis, and
   wherein the image correction target item comprises:
      a double image correction for correcting a phenomenon in which an image is superimposed;
      a visual fatigue correction for correcting a phenomenon in which an image is unclear in focus;
      a rotation correction for correcting a tilted image;
      a horizontal movement correction for correcting a phenomenon in which an image is shifted in a horizontal direction;
      a vertical movement correction for correcting a phenomenon in which an image is shifted in a vertical direction;
      a horizontal correction for correcting bent distortion of an image in a horizontal direction; and
      a vertical correction for correcting bent distortion of an image in a vertical direction.

2. The method of claim 1, wherein the constituent components of the HUD system comprise a plane mirror, a curved mirror, a dust cover, and a windshield glass, and wherein the distortion function of the HUD system is modeled by reflecting distortion functions for the plane mirror, the curved mirror, the dust cover, and the windshield glass, respectively.

3. The method of claim 1, wherein the double image correction is performed such that the HUD image is corrected by changing the $\alpha$, $\beta$, and $\gamma$ values of the parameter values.

4. The method of claim 1, wherein the visual fatigue correction is performed such that the HUD image is corrected by changing only the $\alpha$ value of the parameter values.

5. The method of claim 1, wherein the horizontal movement correction is performed such that the HUD image is corrected by changing the $\alpha$, $\beta$, and $\gamma$ values of the parameter values.

6. The method of claim 1, wherein the horizontal correction is performed such that the HUD image is corrected by changing only the $\alpha$ and $\gamma$ values of the parameter values.

7. The method of claim 1, wherein the vertical correction is performed such that the HUD image is corrected by changing the $\alpha$, $\beta$, and $\gamma$ values of the parameter values.

* * * * *